US010715950B1

(12) United States Patent
Burcham et al.

(10) Patent No.: US 10,715,950 B1
(45) Date of Patent: Jul. 14, 2020

(54) POINT OF INTEREST (POI) DEFINITION TUNING FRAMEWORK

(71) Applicant: Sprint Communications Company L.P., Overland Park, KS (US)

(72) Inventors: Robert H. Burcham, Overland Park, KS (US); Naseer A. Dari, Kansas City, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/398,258

(22) Filed: Apr. 29, 2019

(51) Int. Cl.
*H04W 4/021* (2018.01)
*H04W 64/00* (2009.01)
*H04W 4/029* (2018.01)

(52) U.S. Cl.
CPC .......... *H04W 4/021* (2013.01); *H04W 4/029* (2018.02); *H04W 64/00* (2013.01)

(58) Field of Classification Search
CPC .................................................. H04W 64/00
See application file for complete search history.

(56) References Cited

U.S. PATENT DOCUMENTS

| | | | |
|---|---|---|---|
| 8,391,836 B1 | 3/2013 | Bolot et al. | |
| 8,589,318 B2 | 11/2013 | Sundararajan et al. | |
| 9,122,693 B2 | 9/2015 | Blom et al. | |
| 9,171,461 B1 | 10/2015 | Dabell | |
| 9,326,096 B1 | 4/2016 | Gatmir-Motahari et al. | |
| 9,710,873 B1* | 7/2017 | Hill | G06T 1/20 |
| 10,332,151 B2 | 6/2019 | Megdal | |
| 10,469,981 B1 | 11/2019 | Dannamaneni et al. | |
| 10,555,130 B1 | 2/2020 | Burcham et al. | |
| 2002/0188550 A1 | 12/2002 | Swartz et al. | |

(Continued)

FOREIGN PATENT DOCUMENTS

GB      2516513 A      1/2015

OTHER PUBLICATIONS

Burcham, Robert H., et al., "System and Method of Mobile Phone Location in a Subway Transit Environment," filed Apr. 9, 2019, U.S. Appl. No. 16/379,781.

(Continued)

*Primary Examiner* — Ernest G Tacsik

(57) ABSTRACT

A method of tuning a point-of-interest (POI) definition in a mobile communication device location data analysis application. The method comprises configuring a POI group definition into the analysis application, causing by a POI tuning application the analysis application to execute and count intersections of routes of mobile communication devices with a POI group based on the POI group definition, for each POI that is associated with the POI group, assigning the count of intersections with the POI group by the analysis application to a count of intersections of routes of devices with the POI, receiving information about the count of intersections of the routes of devices with the plurality of POIs in the POI group from the analysis application by the POI tuning application, and presenting the information about the count of intersections in a user interface by the POI tuning application, whereby the analysis application is iteratively tuned.

20 Claims, 4 Drawing Sheets

(56) References Cited

U.S. PATENT DOCUMENTS

| | | | |
|---|---|---|---|
| 2004/0254698 A1* | 12/2004 | Hubbard | G08G 1/0104 701/32.7 |
| 2006/0100956 A1 | 5/2006 | Ryan et al. | |
| 2009/0150217 A1 | 6/2009 | Luff | |
| 2009/0319177 A1* | 12/2009 | Khosravy | G06Q 30/0241 701/408 |
| 2010/0094867 A1 | 4/2010 | Badros et al. | |
| 2010/0279708 A1* | 11/2010 | Lidsrom | H04W 4/029 455/456.1 |
| 2012/0008526 A1* | 1/2012 | Borghei | H04W 4/021 370/254 |
| 2012/0040637 A1 | 2/2012 | Wigren | |
| 2013/0267255 A1* | 10/2013 | Liu | H04W 4/029 455/456.3 |
| 2014/0122220 A1 | 5/2014 | Bradley et al. | |
| 2015/0029176 A1 | 1/2015 | Baxter et al. | |
| 2015/0051829 A1* | 2/2015 | Gearhart | G01C 21/343 701/467 |
| 2015/0081617 A1* | 3/2015 | Shaik | G06Q 30/0201 707/602 |
| 2015/0088423 A1 | 3/2015 | Tuukkanen | |
| 2015/0106011 A1* | 4/2015 | Nesbitt | G01C 21/3476 701/412 |
| 2015/0149285 A1 | 5/2015 | Schroeter | |
| 2015/0201298 A1 | 7/2015 | Zhang et al. | |
| 2016/0076908 A1 | 3/2016 | Pang et al. | |
| 2016/0330589 A1 | 11/2016 | Tuukkanen | |
| 2016/0367899 A1 | 12/2016 | Boncyk | |
| 2017/0153113 A1* | 6/2017 | Gotoh | G06Q 50/10 |
| 2017/0187788 A1* | 6/2017 | Botea | H04L 67/1008 |
| 2017/0213240 A1 | 7/2017 | Waldron et al. | |
| 2017/0223497 A1 | 8/2017 | Wang | |
| 2017/0277716 A1 | 9/2017 | Giurgiu et al. | |
| 2018/0240026 A1 | 8/2018 | Pietrobon et al. | |
| 2018/0259356 A1* | 9/2018 | Rolf | G01C 21/3676 |
| 2018/0266829 A1 | 9/2018 | Frtiz et al. | |
| 2018/0283896 A1* | 10/2018 | Piemonte | G01C 21/3664 |

OTHER PUBLICATIONS

Restriction Requirement dated Jan. 23, 2019, U.S. Appl. No. 15/944,512, filed Apr. 3, 2018.

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

Dannamaneni, Prashanth, et al., "Mobile Phone Mobile Viewshed Analysis," filed Apr. 3, 2018, U.S. Appl. No. 15/944,512.

Burcham, Robert H., et al., "Adapting Content Presentation Based on Mobile Viewsheds," filed Dec. 11, 2017, U.S. Appl. No. 15/838,016.

Bobe, Brooke M., et al., "Mobile Communication Device Locations Data Analysis Supporting Build-Out Decisions", filed Apr. 9, 2019, U.S. Appl. No. 16/379,774.

Burcham, Robert, H., et al., "Route Building Engine Tuning Framework", filed Apr. 29, 2019, U.S. Appl. No. 16/398,254.

Burcham, Robert H., et al., "System and Method of Mobile Phone Location in a Subway Transit Environment," filed Apr. 9, 2019, U.S. Appl. No. 16/379,791.

Burcham, Robert H., et al., "Pre-processing of Mobile Communications Device Geolocations According to Travel Mode in Traffice Analysis," filed Apr. 9, 2019, U.S. Appl. No. 16/379,784.

Burcham, Robert H., et al., "Transformation of Point of Interest Geometries to Lists of Route Segments in Mobile Communication Device Traffic Analysis," Apr. 9, 2019, U.S. Appl. No. 16/379,786.

Burcham, Robert H., et al., "Pattern Matching in Point-of-Interest (POI) Traffic Analysis," filed Apr. 9, 2019, U.S. Appl. No. 16/379,789.

FAIPP Pre-Interview Communication dated Jan. 28, 2020, U.S. Appl. No. 15/838,016, filed Dec. 11, 2017.

Restriction Requirement dated Feb. 21, 2020, U.S. Appl. No. 15/838,016, filed Dec. 11, 2017.

Restriction Requirement dated Nov. 15, 2019, U.S. Appl. No. 16/398,254, filed Apr. 29, 2018.

Notice of Allowance dated Jan. 10, 2020, U.S. Appl. No. 16/398,254, filed Apr. 29, 2018.

Notice of Allowance dated Jan. 17, 2020, U.S. Appl. No. 16/379,786, filed Apr. 9, 2019.

Notice of Allowance dated Feb. 18, 2020, U.S. Appl. No. 16/379,798, filed Apr. 9, 2019.

Notice of Allowance dated Oct. 2, 2019, U.S. Appl. No. 16/379,784, filed Apr. 9, 2019.

Burcham, Robert H., et al., "Pre-processing of Mobile Communications Device Geolocations According to Travel Mode in Traffice Analysis," filed Dec. 13, 2019, U.S. Appl. No. 16/714,277.

* cited by examiner

POINT OF INTEREST (POI) DEFINITION TUNING FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Location data for mobile communication devices may be obtained by the devices themselves locating themselves, for example by capturing latitude-longitude coordinates from a GPS receiver of the devices, and provided to a data store. Alternatively, location data for mobile communication devices may be determined by multilateration or trilateration of signal strength data collected by cell sites in a wireless communication network. The location data for mobile communication devices can be used as a proxy for the location of human beings, e.g., the users of the mobile communication devices. The location data can be analyzed and used for a variety of purposes including managing traffic flows on roadways, locating government branch offices, building out wireless radio access networks, and other purposes.

SUMMARY

In an embodiment, a point-of-interest (POI) tuning framework that provides POI definitions to a mobile communication device location data analysis application is disclosed. The framework comprises a processor, a data store comprising a plurality of location data for each of a plurality of mobile communication devices, a non-transitory memory, a mobile communication device location data analysis application stored in the non-transitory memory, and a POI tuning application stored in the non-transitory memory. The mobile communication device location data analysis application, when executed by the processor, analyzes mobile communication device location data accessed from the data store to determine a plurality clusters of locations of each mobile communication device, for each of a plurality of mobile communication devices, determines a route of the mobile communication device based on the clusters, and determines a count of intersections of the routes of the plurality of mobile communication devices with a POI based on a definition of the POI. The POI tuning application, when executed by the processor, provides a user interface that is configured to receive a POI bearing parameter control input and a fractional POI intersection weight parameter control input and configures the received POI bearing parameter control input into a POI bearing parameter of the definition of the POI. The POI tuning application further configures the received fractional POI intersection weight parameter control input into a fractional POI intersection weight parameter of the definition of the POI, causes the mobile communication device location data analysis application to execute, and presents in the user interface information about the count of intersections of the routes of the plurality of mobile communication devices with the POI, whereby the POI definition is iteratively tuned by repeatedly executing the POI tuning application.

In another embodiment, a method of tuning a point-of-interest (POI) definition in a mobile communication device location data analysis application is disclosed. The method comprises presenting a user interface that is configured to receive a POI group definition control input by a POI tuning application executing on a computer system, where the POI group definition identifies a plurality of POIs associated with a POI group and identifies a geographical area enclosing the plurality of POIs associated with the POI group and configuring the POI group definition into a mobile communication device location data analysis application stored in a memory of the computer system. The method further comprises causing by the tuning application the mobile communication device location data analysis application to execute on the computer system and determine a count of intersections of routes of mobile communication devices with the POI group based at least in part on the POI group definition and, for each POI that is associated with the POI group, assigning the count of intersections with the POI group by the mobile communication device location data analysis application to a count of intersections of routes of mobile communication devices with the POI. The method further comprises receiving information about the count of intersections of the routes of mobile communication devices with the plurality of POIs in the POI group from the mobile communication device location data analysis application by the POI tuning application and presenting the information about the count of intersections in the user interface by the POI tuning application, whereby the mobile communication device location analysis application is iteratively tuned by repeatedly performing the actions of the method.

In yet another embodiment, a method of tuning a point-of-interest (POI) definition in a mobile communication device location data analysis application is disclosed. The method comprises presenting a user interface that is configured to receive a POI dwell time definition control input by a POI tuning application executing on a computer system, where the POI dwell time definition identifies a plurality of dwell time categories and configuring the POI dwell time definition by the POI tuning application into a POI definition of a mobile communication device location data analysis application stored in a memory of the computer system. The method further comprises causing by the POI tuning application the mobile communication device location data analysis application to execute on the computer system and identify intersections of routes of mobile communication devices with the POI based at least in part on the POI definition and determining dwell times of the intersections of routes with the POI by the mobile communication device location data analysis application. The method further comprises, for each dwell time category, determining a count of the intersections of routes of the mobile communication devices having a dwell time that matches the dwell time category by the mobile communication device location data analysis application. The method further comprises receiving information about the count of intersections of the routes of mobile communication devices per dwell time category by the POI tuning application and presenting the information about the count of intersections of the routes of mobile communication devices per dwell time category of the POI in the user interface by the POI tuning application, whereby the mobile communication device location analysis data application is iteratively tuned by repeatedly performing the actions of the method.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
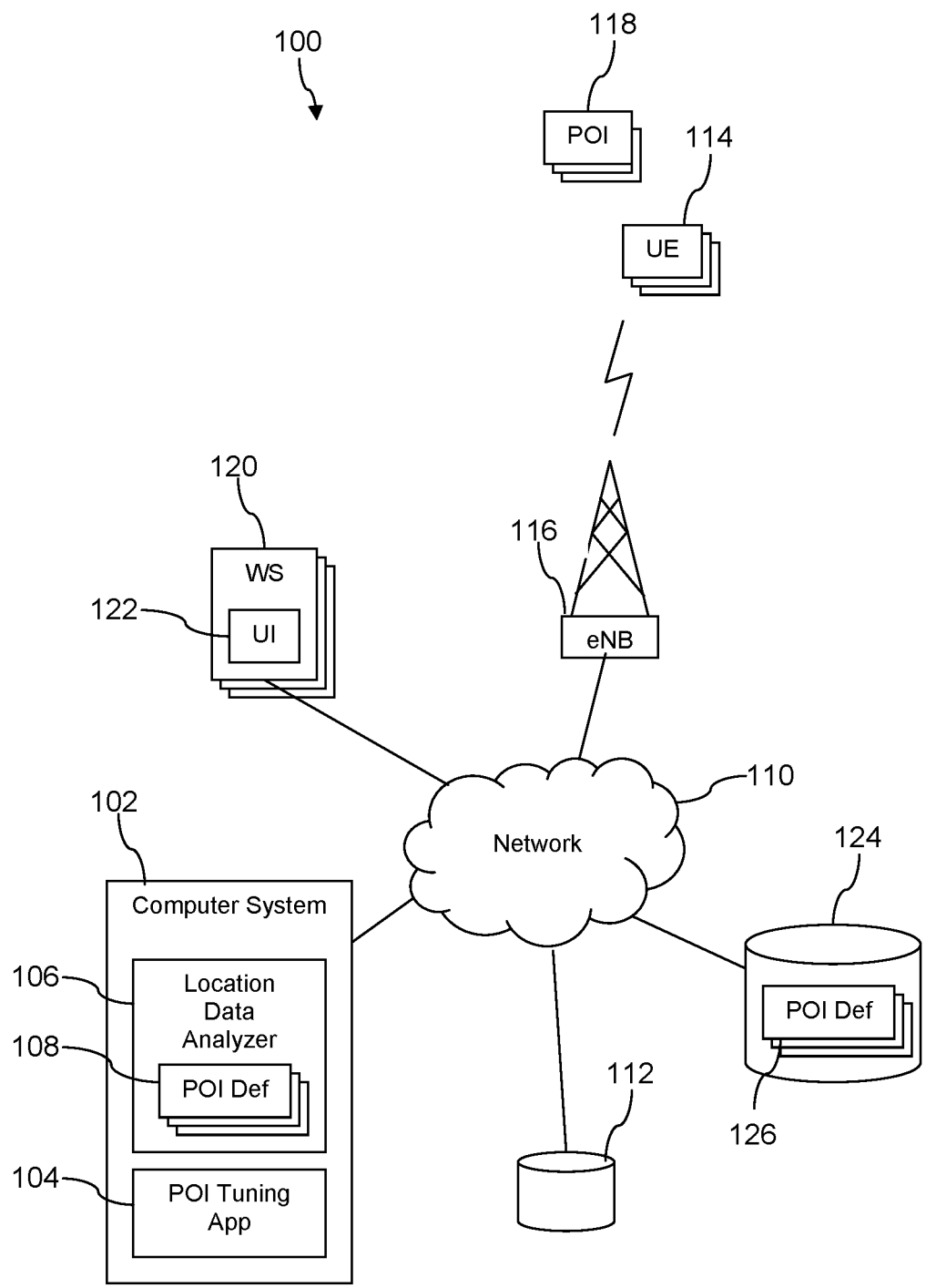
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Location data of mobile communication devices can serve as a proxy for the location of human beings who use those mobile communication devices, and that location data can be analyzed in a variety of useful ways. Location data may be referred to as location fixes herein. The location fixes of a mobile communication device can be analyzed to determine clusters of locations and a centroid of each cluster can be determined for those clusters. The centroid can represent the position of the mobile communication device or associated user or wireless communication service subscriber. For example, while a subscriber is at work, a plurality of location fixes of the device may be captured, where each of the location fixes may vary slightly from the others in location yet generally be within a small geographical area. The small geographical area corresponds to the cluster, and the centroid corresponds to a putative single location within that geographical area that is deemed to represent the location of the mobile communication device. The centroid may be a weighted center of the location fixes, e.g., an average of the positions.

The centroids of location clusters of a mobile communication device may be analyzed to infer movements of the device and positions of the device at different times of day. In an embodiment, the centroids of the location clusters of a mobile communication device may be associated to travel routes (e.g., highways, interstates, subway routes, footpaths, sidewalks, bicycle paths, light rail routes), and the subscriber imputed to specific travel along those travel routes at specific times. This same analysis of location fixes, location clusters, centroids, and routes can be performed for a large number of mobile communication devices. This analysis can be used to evaluate business plans for establishing or moving businesses, to evaluate where to locate government offices such as a satellite office of the department of motor vehicles, to evaluate the value of presentation assets (e.g., digital billboards) proximate to routes, to evaluate marketing plans, to evaluate highway construction and configuration plans, and other projects. The analysis of location data described above may be performed by a location data analyzer application executing on a computer system. For further details on determining location centroids of mobile communication devices and using the location centroids to locate subscribers along routes, see U.S. patent application Ser. No. 15/838,016, filed Dec. 11, 2017, titled "Adapting Content Presentation Based on Mobile Viewsheds," by Robert H. Burcham, et al, and U.S. patent application Ser. No. 15/944,512, filed Jun. 29, 2018, titled "Mobile Phone Mobile Viewshed Analysis," by Prashanth Dannamaneni, et al, both of which are incorporated by reference herein in their entireties.

One of the uses of the analysis of location data described above is to count intersections of location cluster centroids with points of interest (POIs). This counting of intersections may be performed by the location data analyzer application described above. A POI may be a digital presentation asset, such as a digital billboard. A POI may be a building that houses one or more businesses or offices. A POI may be a building that houses one or more retail stores. A POI may be a location such as a city park or a school or another location. Intersection events may occur when a location cluster centroid is located within a definition of a POI, for example within a polygonal area defined for the POI. In some cases determining intersection events includes analyzing a direction of travel of a mobile communication device as inferred by the time sequence of location cluster centroids. For example, a first mobile communication device that is moving towards a POI and passing through a polygonal area defined for the POI may be deemed an intersection event while a second mobile communication device that is moving away from a POI and passing through the polygonal area defined for the POI may not be deemed an intersection event. A POI may be defined in a variety of ways. A POI may be defined by a bearing relative to a location of the POI, an angle bisected by that bearing, and a radius or distance from the POI. An intersection event may occur if the mobile communication device is moving generally towards the POI, is within the defined angle, and at or less than the defined distance from the POI.

A POI may be defined by a plurality of bearings and angles, for example to designate mobile communication devices passing proximate to the POI on different travel routes (e.g., parallel roadways, intersecting roadways). A POI may define a fractional count weighting. For example, it may be supposed that only 3 of 4 of the users associated with mobile communication devices that pass proximate to the POI actually see it or look at it; the users associated with the remaining devices may be looking at a vehicle in front of them or simply not paying attention. The fractional count weighting can make adjustments for this eventuality.

In some areas (e.g., a dense urban area such as Times Square in New York City) a plurality of POIs may be located within a small area, and it may be desired to define a POI group such that an intersection of a location cluster centroid with any single POI of the POI group is imputed as an intersection of the location cluster centroid with all of the POIs that are members of the group. In an embodiment, a POI group may be defined such that it is the union or collection of the areas that would otherwise be associated with each individual member of the POI group. Alternatively, in an embodiment, the POI group may be defined by a perimeter that encloses the collection of individual members of the POI group.

Use of POI groups, where appropriate, can realize computer processing efficiencies while still providing accurate counts of intersections of mobile communication devices with members of the POI group. For example, once an intersection of a mobile communication device is counted for one POI that is a member of a POI group, the analysis of possible intersections of the device with other POIs in the POI group can be truncated and the count of intersections of the device with those other POIs tolled immediately, thereby saving the processing time of completely analyzing the possible intersections with the other POIs in the group. In an example, processing of intersection counts of a device with a portion of the POIs of the group may be performed in parallel. For example, 5 POIs of a POI group comprising 25 separate POIs may be analyzed for intersection with a device concurrently. When any of the concurrent analyses determines an intersection of the POI with the device, the count is ascribed to that POI counting bucket, the count is ascribed to the counting buckets of the other 20 POIs of the POI group, and the concurrent processing of the other 4 POIs is truncated and the count is ascribed to the counting buckets of each of the other 20 POIs. Even if by some chance all 5 parallel analyses complete at the same time—and hence the processing time is expended for each of the 5 analyses—the processing saves 80% of the processing time of performing the analysis independently for each of the 25 POIs.

The present disclosure teaches a POI tuning framework that promotes adapting parameters of the POI definitions and running the location data analyzer application configured with those POI definitions. The resulting intersection counts can act as a measure of the quality of the POI definitions, and the parameters of the POI definitions can be successively adapted to "dial in" the resulting intersection counts. For example, an authoritative source of intersection counts may be compared to the intersection counts produced by the location data analyzer application. By adjusting the POI definitions or tuning parameters so that the count of intersections produced by the location data analyzer application agrees relatively well with the corresponding count of intersections from the authoritative source, the POI definitions may be improved.

The parameters of the POI definitions can be configured with default values which are then adapted, if desired, to elaborate and improve the POI definitions. The default values may be provided based on a coarsely granulated category of POI, for example according as the subject POI is a rural POI, a suburban POI, or an urban POI. Alternatively, the default values may be provided based on a coarsely granulated category of POI, for example according as the POI is in a low density of POI area, a medium density of POI area, or a high density of POI area. The default values may be provided based on a like POI that has been defined previously, for example copying parameters of the cloned POI, with the exception of the location definition of the POI. By providing for tuning of POI parameter values, the POI tuning framework allows for the determination of more accurate counts of intersections. The tuning can adjust a variety of parameters, including the geometry parameters of the POI and the fractional count weighting parameter of the POI, to steer the count of intersections of mobile communication devices with the POI to be consistent with an expected count of intersections. The expected count of intersections may be determined by a craft person based on his or her experience. The expected count of intersections may be determined based at least in part on authoritative data. The authoritative data may be provided by a government entity on traffic at a specific point on a road. The authoritative data may be provided by a sports venue on attendance figures. The authoritative data may be determined by conducting a survey at the POI.

In an embodiment, the POI definitions may comprise a definition of a dwell time. An intersection of a location fix with the POI may not be counted unless the dwell time associated with the POI is satisfied. For example, if the dwell time is defined to be 5 minutes or more, a drive by of a mobile communication device may not toll the count of the POI. Another mobile communication device that remains within the extents of the defined POI for 8 minutes, by contrast, would toll the count of the POI. The use of a POI dwell time parameter may be useful for discriminating traffic that may actually visit a location from traffic that is just passing through. Alternatively, the dwell time parameter may be useful to identify subscribers who are proximate to the POI long enough to be likely to see and experience a content presented at the POI and distinguish them from other subscribers who may be moving too quickly to pay attention to the same content that they may have been exposed to. Thus, the dwell time parameter can provide more actionable and richer information about subscriber traffic in the area of the POI.

In an embodiment, a POI definition may comprise a plurality of dwell time parameters or dwell time buckets. For example, a POI may have a less than 1 minute dwell time bucket, a 1 minute to less than 5 minute dwell time bucket, a 5 minute to less than 15 minute dwell time bucket, and a 15 minute or more dwell time bucket. Counts of intersections with this POI may be ascribed to one of the dwell time buckets, thereby allowing distinguishing among the different subscribers based on their dwell time in the extents of the POI. This in turn may allow for performing analysis that can inform decisions about how long to present content at the POI or what kind of content to present at the POI. For example, a sequence of related content may build a quasi-narrative that is more compelling for a subscriber that has the opportunity to see the whole sequence of presented content. This same sequence of related content, however, may fall flat for a subscriber who is quickly passing by and doesn't have the benefit of seeing the sequence of content presentations. The use of multiple different dwell time ranges also provides more actionable and more rich information about subscriber traffic proximate to the POI.

Turning now to FIG. 1, a system 100 is described. In an embodiment, the system 100 comprises a computer system 102 having a point of interest (POI) tuning application 104 and a location data analyzer application 106 that comprises definitions of POIs 108. The POI tuning application 104, the location data analyzer application 106, and the definitions of POIs 108 may be stored in a memory of the computer system 102, for example in a non-transitory memory. The computer system 102 is communicatively coupled to a network 110 that comprises one or more public networks, one or more private networks, or a combination thereof. The system 100 further comprises a first data store 112 coupled to the network 110. The system 100 comprises a plurality of cell sites 116 that may be wirelessly linked to mobile communication devices (UE) 114. The mobile communication devices 114 may move as the users associated with the mobile communication devices 114 move, for example commuting to work, commuting home from work, driving out to a shopping venue, etc. While the mobile communication devices 114 are moving they may pass proximate to points of interest (POIs) 118. The first data store 112 may store location fix information associated with the mobile communication devices 114, for example a plurality of location fix information for each device 114 at different times.

The system 100 further comprises a plurality of work stations 120 coupled to the network 110 and presenting a user interface 122 extended or provided by the tuning application 104. The user interface 122 may be used by owners of POIs 118, by employees of an organization that leases the use of the POIs 118, or by others to tune the parameters of the POI definitions 108 and store these as configured POI definitions 126 in a second data store 124 that is communicatively coupled to the network 110.

The definitions of POIs 108 may comprise a location parameter, a bearing parameter, and an angular arc parameter. The definitions of POIs 108 may comprise a plurality of bearing and associated angular arc parameters. The definitions of POIs 108 may comprise a fractional intersection count weighting parameter. When a definition of a POI 108 comprises a plurality of bearing and associated angular arc parameters, each bearing and associated angular arc parameter may be associated with its own distinct fractional intersection count weighting parameter. The definitions of POIs 108 may comprise a POI group identity (e.g., the definition of the POI 108 may associate the subject POI 108 to a specific POI group by designating the POI group identity). The definitions of POIs 108 may comprise one or more dwell time definitions. The POI tuning application 104 provides controls to the user interface 122 to allow users of the workstations 120 to adjust the various parameters of the POIs 108 and then see the effects of these adjustments on the results of intersection analysis For example, after updating or adapting a definition of a POI 108, the user interface 122 may be commanded to execute the location data analyzer 106 on that specific POI. The results of intersection analysis for the specific POI may be presented on the user interface 122 for review. The user may then choose to further adapt the definition of the POI 108 and iteratively invoke POI intersection analysis by the location data analyzer 106.

In an embodiment, the user interface 122 and the POI tuning application 104 may present authoritative information to the user interface 122. For example, information about attendance numbers of a professional sports event provided by an operator of the associated sports event venue may be considered authoritative information and may be presented on the user interface 122 (e.g., in the circumstance that the POI 118 is located proximate to, or within, the subject sports event venue). For example, information about highway traffic collected by a state transportation department may be considered authoritative information and may be presented on the user interface 122. For example, information about carpooling in a specific city or along a specific highway may be considered authoritative information and may be presented on the user interface 122. Such car pooling information, for example, may be used to tune a fractional counting parameter.

In some circumstances the authoritative information may not be directly comparable to the count of intersections with the POI 118, but the authoritative information may still be useful in tuning the definition of the POI 108. For example, the count of intersections with the POI 118 may be assumed to be proportional to the data provided by the authoritative information, and hence the hourly flux of the count of intersections with the POI 118 ought to track proportionally the hourly flux of the authoritative information. If the numbers do not track, the parameters of the definition of the POI 108 may be adapted until they do track proportionally. In some circumstances, a proportionality may be known between the authoritative information and the count of intersections with the POI 118.

The user interface 122 may invoke the location data analyzer 106 to process based on a single definition of a POI 108 or to process based on a plurality of definitions of POIs 108. For example, the user interface 122 may invoke the location data analyzer 106 to process based on all the definitions of POIs 108 belonging to a same POI group. For example, the user interface 122 may invoke the location data analyzer 106 to process based on a plurality of specifically identified definitions of POIs 108, for example the definitions of POIs 108 associated with the POIs 118 that a business operates or leases.

The definitions of POIs 108 may be initialized to default parameter values by the location data analyzer 106, for example based on average parameter values of like POIs 118. The default parameter values may not identify a location parameter, as that may be considered to be a required parameter to be explicitly defined. The default parameter values may not identify more than a single bearing parameter and associated angular arc parameter, as multiple bearing and associated angular arc parameters may be considered to be parameters requiring to be explicitly defined and otherwise initialized to null values or to zero values.

Figure 2:
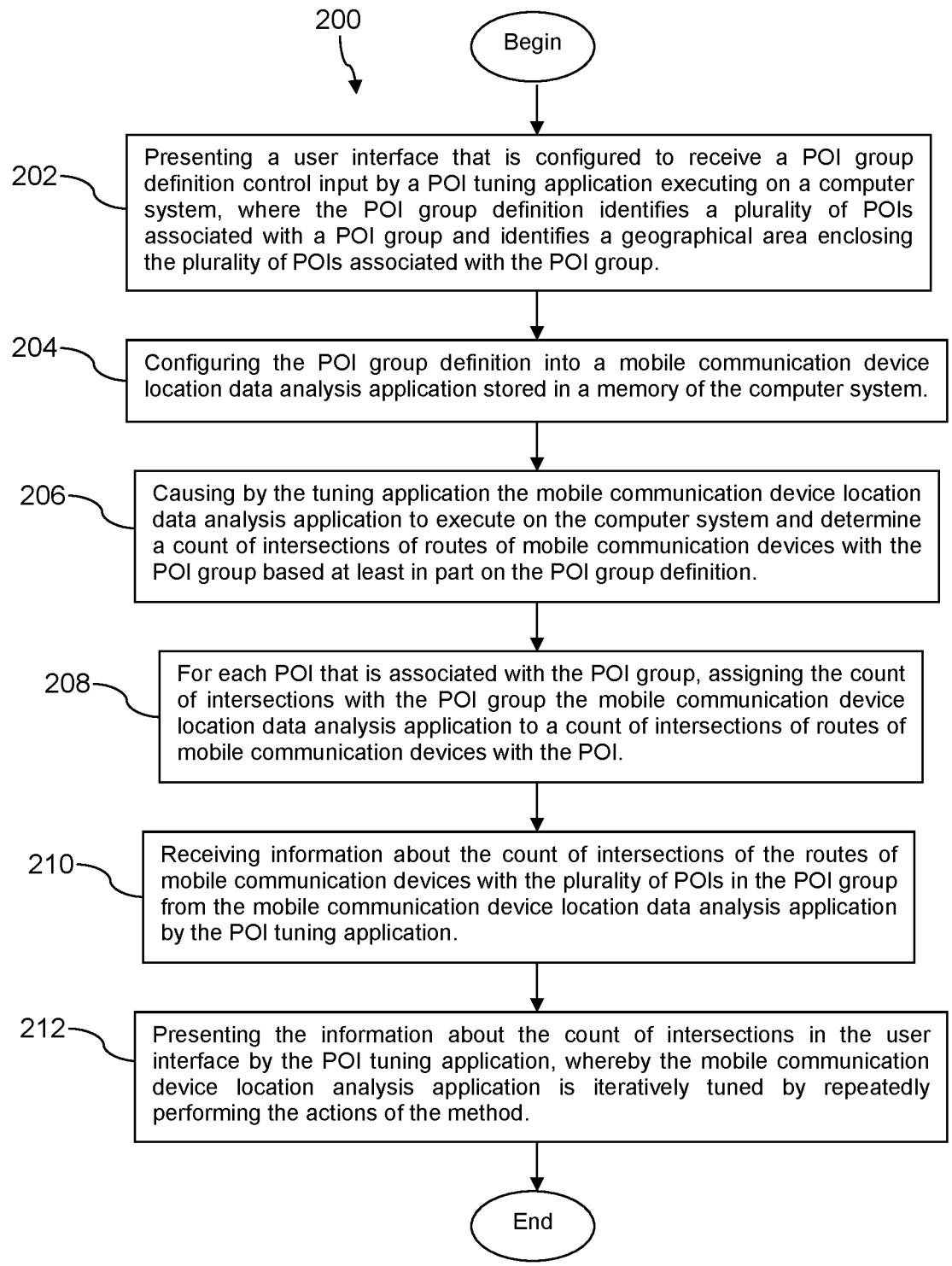
FIG. 2 is a flow chart of a method according to an embodiment of the disclosure.

Turning now to FIG. 2, a method 200 is described. Method 200 is a method of tuning a point-of-interest (POI) definition in a mobile communication device location data analysis application that may be executed on a computer system, for example on computer system 102 described above with reference to FIG. 1. At block 202, the method 200 comprises presenting a user interface that is configured to receive a POI group definition control input by a POI tuning application executing on a computer system, where the POI group definition identifies a plurality of POIs associated with a POI group and identifies a geographical area enclosing the plurality of POIs associated with the POI group.

At block 204, the method 200 comprises configuring the POI group definition into a mobile communication device location data analysis application stored in a memory of the computer system. At block 206, the method 200 comprises causing by the tuning application the mobile communication device location data analysis application to execute on the computer system and determine a count of intersections of routes of mobile communication devices with the POI group based at least in part on the POI group definition.

At block 208, the method 200 comprises, for each POI that is associated with the POI group, assigning the count of intersections with the POI group the mobile communication device location data analysis application to a count of intersections of routes of mobile communication devices with the POI. At block 210, the method 200 comprises receiving information about the count of intersections of the routes of mobile communication devices with the plurality of POIs in the POI group from the mobile communication device location data analysis application by the POI tuning application. At block 212, the method 200 comprises presenting the information about the count of intersections in the user interface by the POI tuning application, whereby the mobile communication device location analysis application is iteratively tuned by repeatedly performing the actions of the method. The tuning may be performed based on comparing the count of intersections to an expected count and adjusting the POI parameters from iteration to iteration to steer the counts produced by the mobile communication device location data analysis application to be consistent with an expected count of intersections or an authoritative count of intersections.

Figure 3:
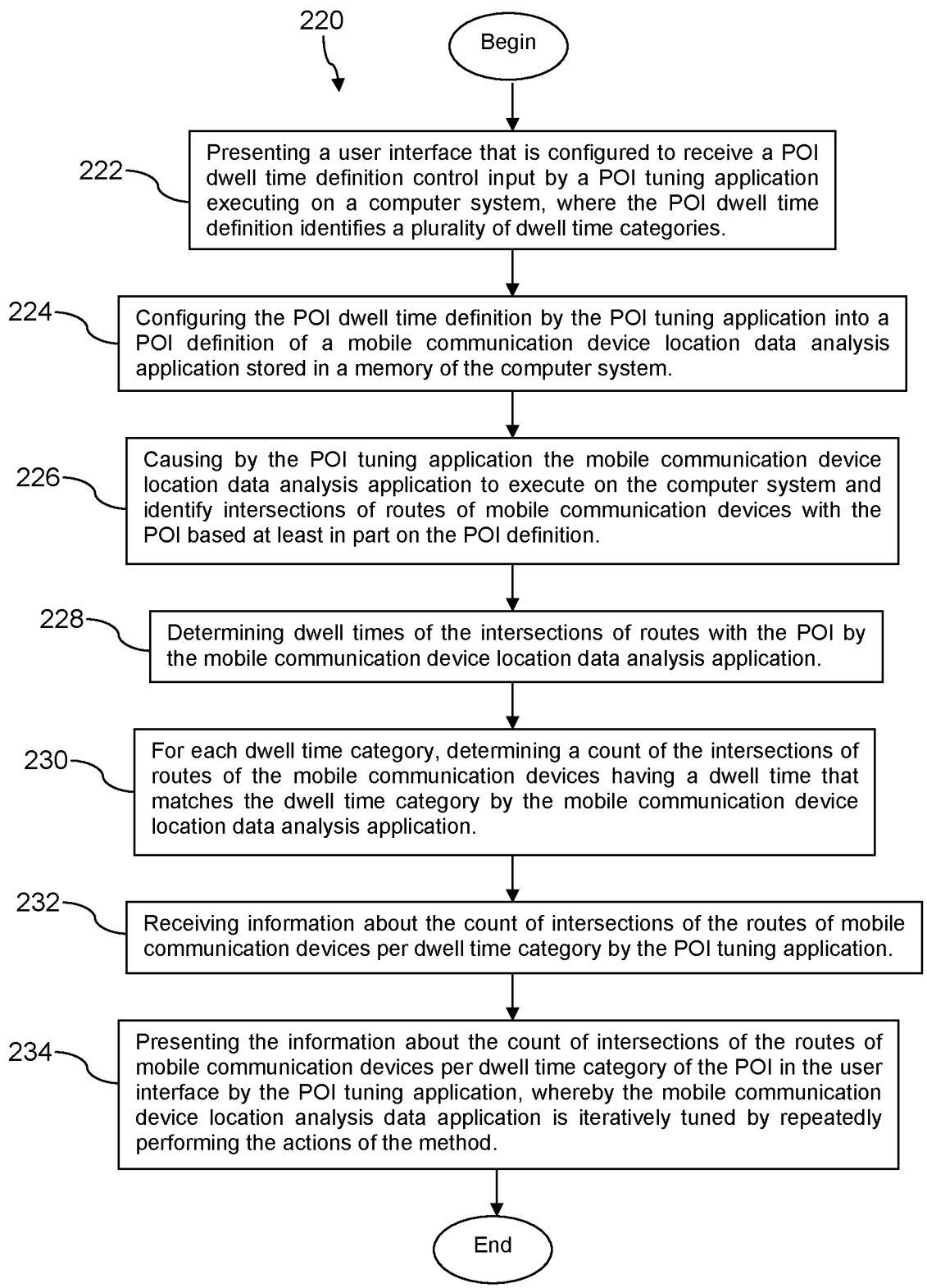
FIG. 3 is a flow chart of another method according to an embodiment of the disclosure.

Turning now to FIG. 3, a method 220 is described. Method 220 is a method of tuning a point-of-interest (POI) definition in a mobile communication device location data analysis application that may be performed on a computer system, for example on computer system 102 described above with reference to FIG. 1. At block 222, method 220 comprises presenting a user interface that is configured to receive a POI dwell time definition control input by a POI tuning application executing on a computer system, where the POI dwell time definition identifies a plurality of dwell time categories.

At block 224, the method 220 comprises configuring the POI dwell time definition by the POI tuning application into a POI definition of a mobile communication device location data analysis application stored in a memory of the computer system. At block 226, the method 220 comprises causing by the POI tuning application the mobile communication device location data analysis application to execute on the computer system and identify intersections of routes of mobile communication devices with the POI based at least in part on the POI definition.

At block 228, the method 220 comprises determining dwell times of the intersections of routes with the POI by the mobile communication device location data analysis application. At block 230, the method 220 comprises for each dwell time category, determining a count of the intersections of routes of the mobile communication devices having a dwell time that matches the dwell time category by the mobile communication device location data analysis application.

At block 232, the method 220 comprises receiving information about the count of intersections of the routes of mobile communication devices per dwell time category by the POI tuning application. At block 234, the method 220 comprises presenting the information about the count of intersections of the routes of mobile communication devices per dwell time category of the POI in the user interface by the POI tuning application, whereby the mobile communication device location analysis data application is iteratively tuned by repeatedly performing the actions of the method.

Figure 4:
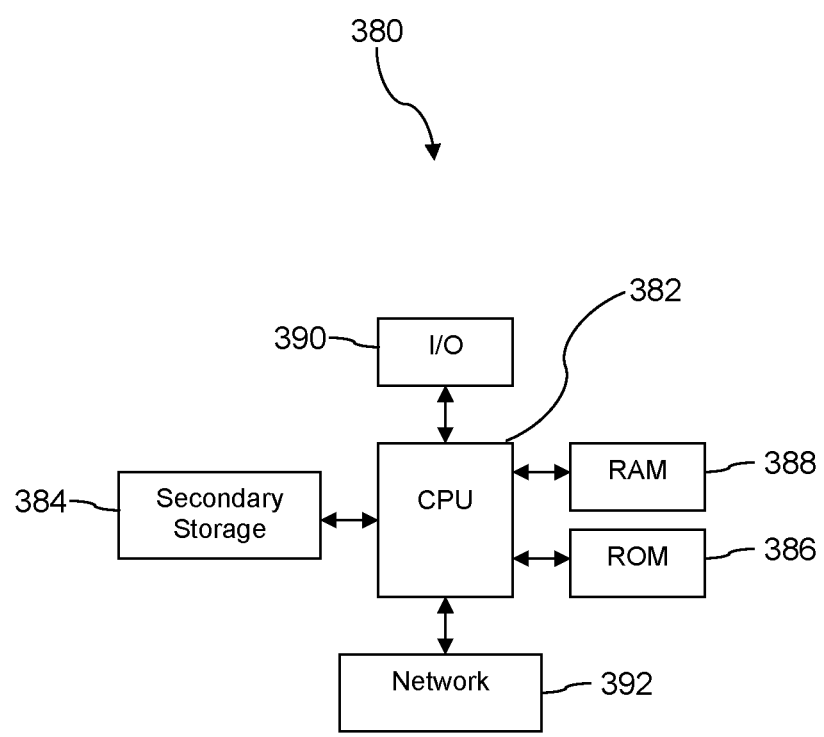
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A point-of-interest (POI) tuning framework that provides POI definitions to a mobile communication device location data analysis application, comprising:
   a processor;
   a data store comprising a plurality of location data for each of a plurality of mobile communication devices;
   a non-transitory memory;
   the mobile communication device location data analysis application stored in the non-transitory memory that, when executed by the processor,
      analyzes mobile communication device location data accessed from the data store to determine a plurality clusters of locations of each mobile communication device,
      for each of a plurality of mobile communication devices, determines a route of the mobile communication device based on the clusters, and
      determines a count of intersections of the routes of the plurality of mobile communication devices with a POI based on a definition of the POI; and
   a POI tuning application stored in the non-transitory memory that, when executed by the processor,
      provides a user interface that is configured to receive a POI bearing parameter control input and a fractional POI intersection weight parameter control input,
      configures the received POI bearing parameter control input into a POI bearing parameter of the definition of the POI,
      configures the received fractional POI intersection weight parameter control input into a fractional POI intersection weight parameter of the definition of the POI,
      causes the mobile communication device location data analysis application to execute configured with the definition of the POI to determine the count of intersections of the routes of the plurality of mobile communication devices with the POI, wherein the fractional POI intersection weight parameter reduces the count of intersections of the routes of the plurality of mobile communication devices with the POI to be consistent with an expected count of intersections determined based at least in part on authoritative data,
      presents in the user interface information about the count of intersections of the routes of the plurality of mobile communication devices with the POI, and
      based on the information about the count of intersections of the routes of the plurality of mobile communication devices with the POI, adapts the definition of the POI by:
         configuring one or more changed parameter control inputs in one or more parameters of the adapted definition of the POI, and
         causing the mobile communication device location data analysis application to execute configured with the adapted definition of the POI to determine a revised count of intersections of the routes of the plurality of mobile communication devices with the POI based on the adapted definition of the POI.

2. The POI tuning framework of claim 1, wherein the user interface is further configured to receive an angular arc parameter control input and the POI tuning application configures the received angular arc parameter into an angular arc parameter of the definition of the POI.

3. The POI tuning framework of claim 1, wherein the user interface is further configured to receive a POI group identity parameter control input and the POI tuning application configures the received POI group identity parameter into a POI group identity parameter of the definition of the POI.

4. The POI tuning framework of claim 1, wherein the user interface is further configured to receive a dwell time parameter control input and the POI tuning application configures the received dwell time parameter into a dwell time parameter of the definition of the POI.

5. The POI tuning framework of claim 1, wherein the user interface is further configured to receive an identification of a plurality of POIs and to present in the user interface information about the counts of intersections of the routes of the plurality of mobile communication devices with the identified POIs.

6. The POI tuning framework of claim 1, wherein the POI tuning application further presents authoritative information associated with the information about the count of intersections, and wherein the POI tuning application adapts the definition of the POI based additionally on a comparison of the authoritative information and the count of the intersections of the routes of the plurality of mobile communication devices with the POI.

7. The POI tuning framework of claim 6, wherein the authoritative information is selected from the group consisting of highway traffic information, information about attendance numbers for a professional sports event, and carpooling information.

8. A method of tuning a point-of-interest (POI) definition in a mobile communication device location data analysis application, comprising:
   presenting a user interface that is configured to receive a POI group definition control input by a POI tuning application executing on a computer system, where the POI group definition identifies a plurality of POIs associated with a POI group and identifies a geographical area enclosing the plurality of POIs associated with the POI group;
   configuring the POI group definition into the mobile communication device location data analysis application stored in a memory of the computer system;
   causing by the POI tuning application the mobile communication device location data analysis application to execute on the computer system configured with the POI group definition to determine a count of intersections of routes of mobile communication devices with the POI group based at least in part on the POI group definition, wherein the POI group definition defines the POI group such that an intersection of a location cluster centroid with any single POI of the POI group is imputed as an intersection of the location cluster centroid with all of the POIs that are members of the POI group;

for each POI that is associated with the POI group, assigning the count of intersections with the POI group by the mobile communication device location data analysis application to a count of intersections of routes of mobile communication devices with the POI;

receiving information about the count of intersections of the routes of mobile communication devices with the plurality of POIs in the POI group from the mobile communication device location data analysis application by the POI tuning application;

presenting the information about the count of intersections in the user interface by the POI tuning application; and based on the information about the count of intersections of the routes of the mobile communication devices with the plurality of POIs, adapting, by the POI turning application, the POI group definition by:

configuring one or more changed parameter control inputs in one or more parameters of the adapted POI group definition; and causing the mobile communication device location data analysis application to execute configured with the adapted POI group definition to determine a revised count of intersections of the routes of the mobile communication devices with the plurality of POIs based on the adapted POI group definition.

9. The method of claim 8, wherein the user interface is further configured to receive a POI bearing parameter control input and a fractional POI intersection weight parameter control input, further comprising configuring the POI bearing parameter and fractional POI intersection weight parameter into the mobile communication device location data analysis application, and wherein the mobile communication device location data analysis application determines the count of intersections of routes of mobile communication devices with the POI group further based at least in part on the POI bearing parameter and fractional POI intersection weight parameter.

10. The method of claim 8, further comprising presenting authoritative information associated with the count of intersections, wherein the authoritative information comprises highway traffic information, and wherein the POI tuning application adapts the POI group definition based additionally on a comparison of the highway traffic information and the count of the intersections of the routes of the mobile communication devices with the plurality of POIs.

11. The method of claim 8, further comprising presenting authoritative information associated with the count of intersections, wherein the authoritative information comprises information about attendance numbers for a professional sports event, and wherein the POI tuning application adapts the POI group definition based additionally on a comparison of and the information about attendance numbers for the professional sports event and the count of the intersections of the routes of the mobile communication devices with the plurality of POIs.

12. The method of claim 8, further comprising presenting authoritative information associated with the count of intersections, wherein the authoritative information comprises carpooling information, and wherein the POI tuning application adapts the POI group definition based additionally on a comparison of the carpooling information and the count of the intersections of the routes of the mobile communication devices with the plurality of POIs.

13. The method of claim 8, wherein the user interface is further configured to receive a POI dwell time parameter control input, further comprising configuring the POI dwell time parameter into the mobile communication device location data analysis application, and wherein the mobile communication device location data analysis application determines the count of intersections of routes of mobile communication devices with the POI group further based at least in part on the POI dwell time parameter.

14. A method of tuning a point-of-interest (POI) definition in a mobile communication device location data analysis application, comprising:

presenting a user interface that is configured to receive a POI dwell time definition control input for a POI by a POI tuning application executing on a computer system, where the POI dwell time definition identifies a plurality of dwell time categories corresponding to different dwell time ranges;

configuring the POI dwell time definition by the POI tuning application into a POI definition of the mobile communication device location data analysis application stored in a memory of the computer system;

causing by the POI tuning application the mobile communication device location data analysis application to execute on the computer system configured with the POI definition to identify intersections of routes of mobile communication devices with the POI based at least in part on the POI definition;

determining dwell times of the intersections of routes with the POI by the mobile communication device location data analysis application;

for each dwell time category, determining a count of the intersections of routes of the mobile communication devices having a dwell time that matches the dwell time category by the mobile communication device location data analysis application;

receiving information about the count of intersections of the routes of mobile communication devices per dwell time category by the POI tuning application;

presenting the information about the count of intersections of the routes of mobile communication devices per dwell time category of the POI in the user interface by the POI tuning application; and based on the information about the count of intersections of the routes of mobile communication devices per dwell time category, adapting, by the POI turning application, the POI definition by:

configuring one or more changed parameter control inputs in one or more parameters of the adapted POI definition; and causing the mobile communication device location data analysis application to execute configured with the adapted POI definition to determine a revised count of intersections of the routes of mobile communication devices with the POI per dwell time category based on the adapted POI definition.

15. The method of claim 14, wherein the user interface is further configured to receive a POI bearing parameter control input and a POI angular arc parameter control input, further comprising configuring the POI bearing parameter and the POI angular arc parameter into the POI definition of the mobile communication device location data analysis application.

16. The method of claim 14, wherein the user interface is configured to receive a plurality of POI bearing parameter control inputs and a plurality of POI angular arc parameter control inputs, further comprising configuring the plurality of POI bearing parameters and the plurality of POI angular arc parameters into the POI definition of the mobile communication device location data analysis application.

17. The method of claim 16, wherein the user interface is configured to receive a fractional intersection count weighting associated with each of the plurality of POI bearing parameters, further comprising configuring the fractional intersection count weighting parameters into the POI definition of the mobile communication device location data analysis application.

18. The method of claim 14, wherein the user interface is further configured to receive a POI group identity parameter control input, further comprising configuring the POI group identity parameter into the POI definition of the mobile communication device location data analysis application.

19. The method of claim 14, further comprising presenting authoritative information associated with the information about the count of intersections, and wherein the POI tuning application adapts the POI definition based additionally on a comparison of the authoritative information and the count of intersections of the routes of mobile communication devices per dwell time.

20. The method of claim 19, wherein the authoritative information is selected from the group consisting of highway traffic information, information about attendance numbers for a professional sports event, and carpooling information.

* * * * *